(No Model.)

J. H. TIFFANY.
TRUCK.

No. 297,876.  Patented Apr. 29, 1884.

WITNESSES:
Fred. G. Dieterich.
R. G. Du Bois

INVENTOR.
John H. Tiffany
by W. H. Doolittle
ATTORNEYS.

UNITED STATES PATENT OFFICE.

JOHN H. TIFFANY, OF DIMOCK, PENNSYLVANIA.

TRUCK.

SPECIFICATION forming part of Letters Patent No. 297,876, dated April 29, 1884.

Application filed January 29, 1884. (No model.)

*To all whom it may concern:*

Be it known that I, JOHN H. TIFFANY, a citizen of the United States, residing at Dimock, in the county of Susquehanna and State of Pennsylvania, have invented certain new and useful Improvements in Vehicles; and I do hereby declare the following to be a full, clear, and exact description of the invention, such as will enable others skilled in the art to which it appertains to make and use the same.

My invention relates to draft-vehicles; and its object is the construction of a low vehicle, which will be highly convenient for farmers and others in the hauling of heavy loads over rough and uneven ground; and will obviate the necessity of lifting or lowering the object to be carried more than a few inches from the ground, and which in construction will be cheap and durable.

It consists in providing a low truck or sled or similar vehicle with a set of large wheels on an axle, and a set of smaller wheels and runners, so that on uneven ground or with an unbalanced load the smaller wheels and runners, one or both, will aid the larger wheels in supporting and carrying the load.

Figure 1:
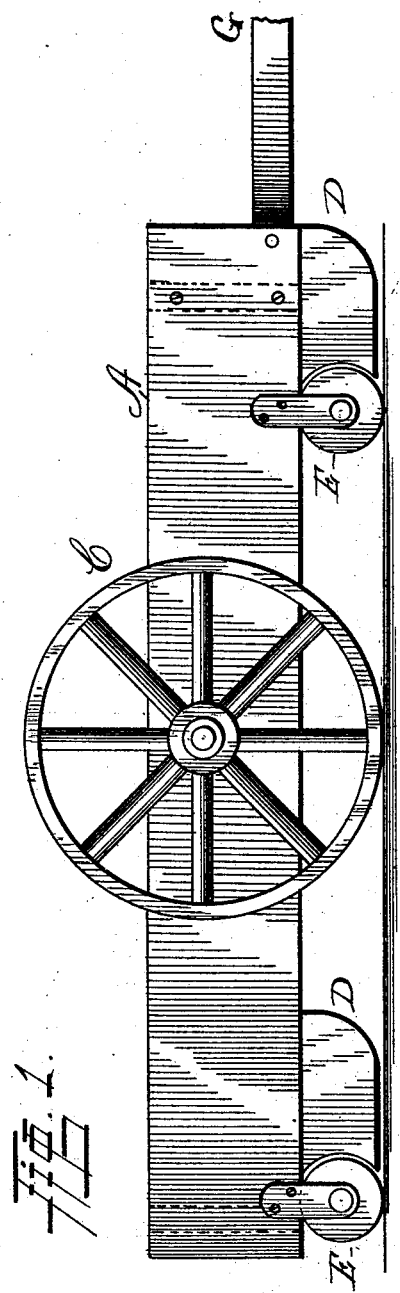
Figure 2:
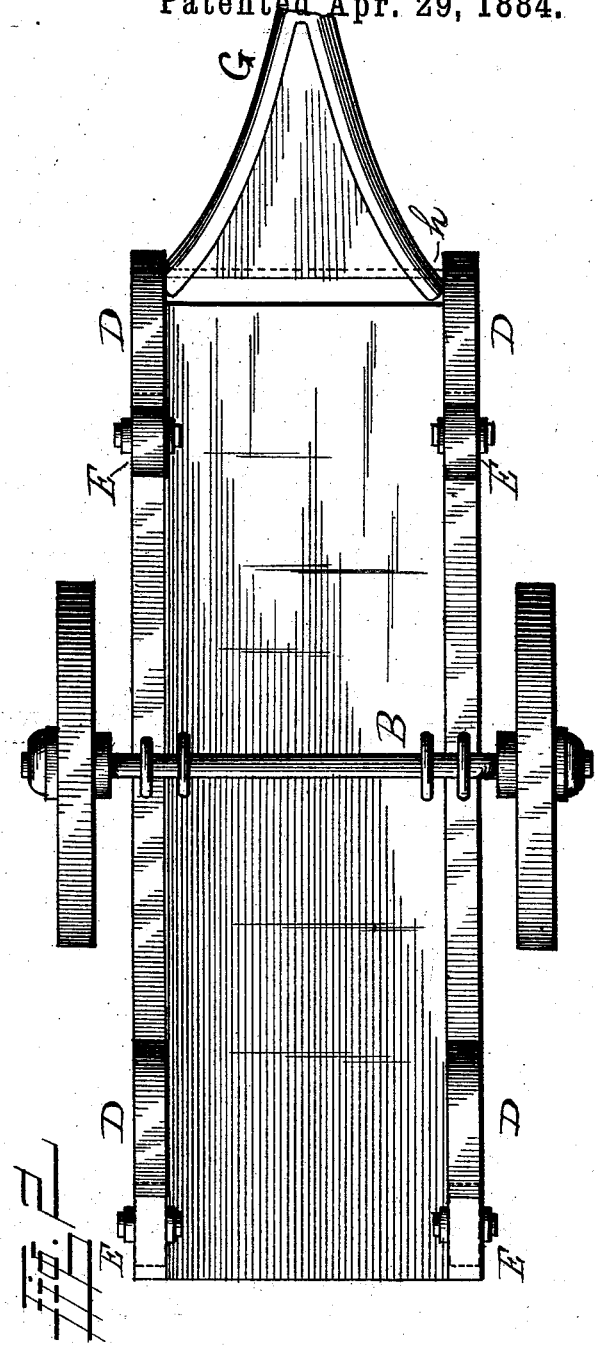

It is illustrated in the accompanying drawings, in which Figure 1 is a side view in elevation; Fig. 2, a bottom plan view.

In the drawings, A represents the body or frame of a vehicle, supported on a bent axle, B. To this, or to any other form of axle which will admit the body to be hung very near the ground, are secured large wheels C. These wheels I preferably make of a diameter by which their height will exceed that of the body of the truck, and provide them with broad tires. On the under side of each corner of the frame I add a short runner, D; or those portions of the frame may be constructed in the form of runners, substantially of the form shown in the drawings. Directly back of each of these runners I secure to the frame or to the runners, by brackets or by any other suitable means, a small wheel, E, which may be hung so as to touch the ground on a line with the runners, or may extend a little below the runners, so as to first touch the ground.

In order that the truck may be free to tip forward or back, so as to bring into play the action of the runners or the small wheels, or both, when occasion requires, I attach the tongue G to the truck by means of a flexible joint. In the drawings this joint is shown as formed of a rod, $h$, extending through the ends of the frame and the back portion of the tongue on which the tongue swings; but it is apparent that other well-known forms of flexible connections may be used. Thills may be used in place of the tongue. The runners may run the entire length of the vehicle; or, like a stone-sled, the bottom of the truck may be composed of such runners.

In operation, in moving along on level ground the whole load may be balanced and sustained upon the larger wheels; but on meeting with an obstruction, or on ascending or descending ground, or in contact with hollows, the load may be partly or wholly thrown on the runners and small wheels in front or rear, or at both ends, and thus aid or relieve the action of the larger wheels.

In some cases the smaller wheels may be dispensed with, if desired.

The further operation and advantages of the structure will be readily seen without additional description.

What I claim, and desire to secure by Letters Patent, is—

1. In a vehicle, the combination of a set of wheels with runners which are adapted to cooperate with the wheels to sustain the load when the vehicle is in motion, substantially as described.

2. In a vehicle, the combination of a set of larger wheels, the smaller wheels, the runners, and the flexible tongue adapted to each other, substantially in the manner and for the purpose set forth.

In testimony whereof I affix my signature in presence of two witnesses.

JOHN H. TIFFANY.

Witnesses:
Jos. H. BLACKWOOD,
H. A. HALL.